United States Patent

[11] 3,586,937

| [72] | Inventor | Walter U. Holzer<br>Meersburg/Bodensee, Schutzenrain,<br>Germany |
|---|---|---|
| [21] | Appl. No. | 883,393 |
| [22] | Filed | Dec. 9, 1969 |
| [45] | Patented | June 22, 1971<br>Continuation-in-part of application Ser. No.<br>775,271, Nov. 13, 1968, now abandoned. |

[54] PROGRAMMED SWITCHING DEVICE INCLUDING SPARK PREVENTION
10 Claims, 1 Drawing Fig.

| [52] | U.S. Cl. | 318/138,<br>307/135, 307/136, 307/141.8, 318/696 |
|---|---|---|
| [51] | Int. Cl. | H02k 37/00 |
| [50] | Field of Search | 307/135,<br>136, 141.8, 134, 135; 318/138, 459 |

[56] References Cited
UNITED STATES PATENTS

| 3,430,063 | 2/1969 | Webb | 307/136 |
|---|---|---|---|
| 3,437,898 | 4/1969 | Bates | 318/138 |

Primary Examiner—G. R. Simmons
Attorney—Sherman Levy

ABSTRACT: A switching device controlling the various load circuits of a washing machine. The load circuits are controlled by respective electronic switches, which are in turn controlled by mechanical switches operated by cams on a cam disc assembly driven by a stepping motor. The stepping motor is controlled by respective command switches responding to different conditions in the washing machine, such as water temperature, water level, etc. The stepping motor has a secondary winding which transmits control signals through a pulse transformer to the electronic switches. The electronic switches are made conductive when the stepping motor is turned off and are made nonconductive when the stepping motor is turned on.

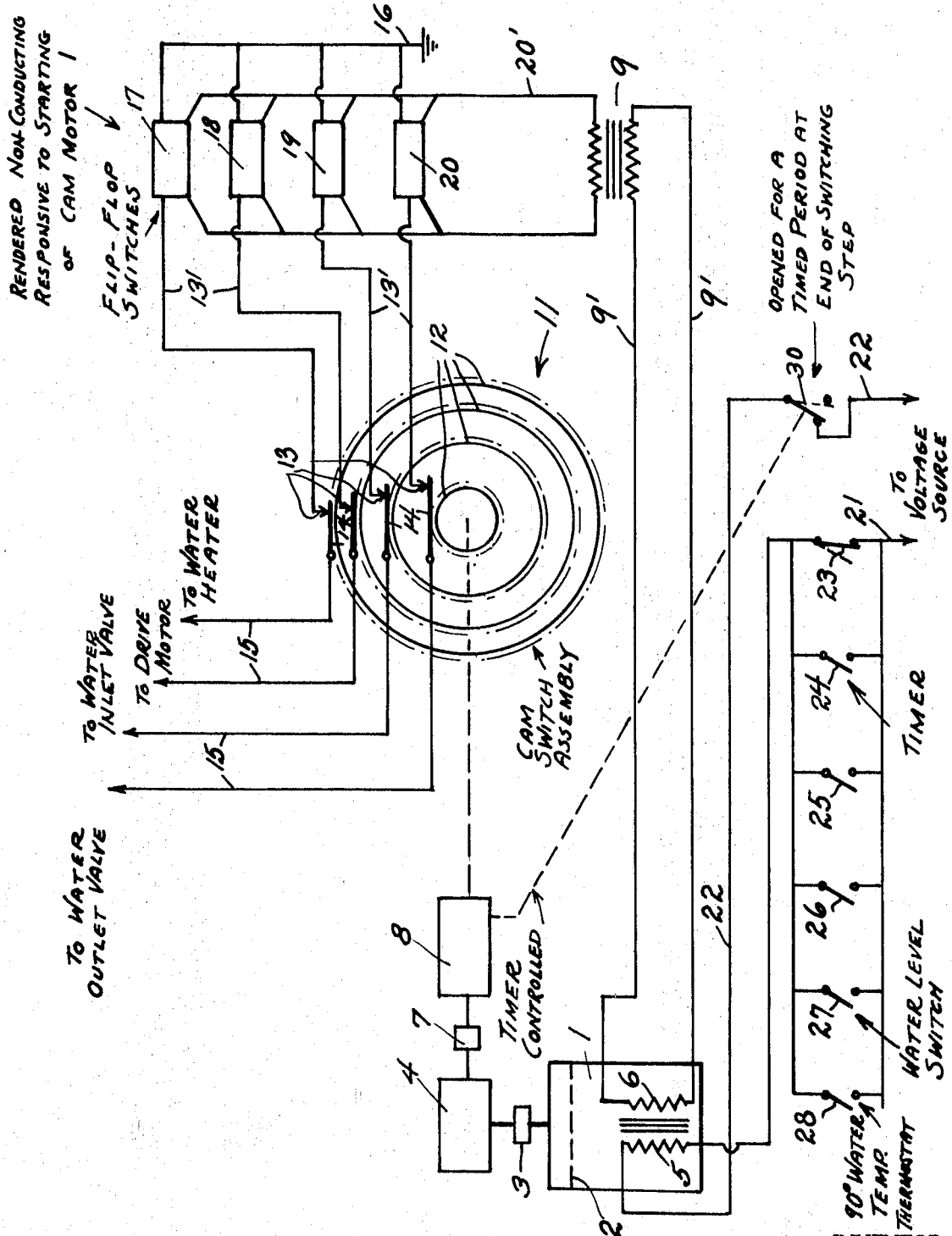

PROGRAMMED SWITCHING DEVICE INCLUDING SPARK PREVENTION

This application is a continuation-in-part of my prior application, Ser. No. 775,271, filed Nov. 13, 1968, now abandoned and entitled "Programmed Switching Device."

This invention concerns a programmed switching device for the control of several mutually independent load circuits, especially in a washing machine, by means of mechanical switches which are actuated by trip cams of a programmed switching device that moves by steps and is driven by a motor, whereby the motor is controlled, i.e., switched on and off, by at least one command switch.

With such programmed devices it is very important that the switching on and off of the load, e.g., the drive motor of the washing drum of a washing machine, the intake and outlet vales that regulate the water level in the washing machine, the heating or other devices, etc., are switched on or off at precisely fixed times. To achieve this there was hitherto always a need in such programmed switching devices for expensive and complicated step switching drives for the step-by-step advance of the programmed switching device. In addition, the trip cams disposed on the programmed switching device for the actuation of the mechanical switches of the load circuit must be very precisely disposed and shaped as regards their angular position and the mechanical switches that are actuated by these cams must be accurately adjusted. These requirements led to a very considerable increase in cost.

A further disadvantage of these known programmed switching devices consists in that the contact switches were energized also during the switching process. This energizing voltage caused strong spark generating during the switching process, and thereby caused marked corrosion and very premature destruction of the contact elements of the switches.

It is therefore the principal purpose of the invention to provide means by which, on the one hand, it is possible to simplify the fabrication of the trip cams on the trip cam disc assembly and the adjustment work on the mechanical switches, and on the other hand to protect the contacts of the switches against corrosion and burnout through spark generation.

A further principal purpose of the invention is to achieve, by simple means, accurate switching processes in the control of the load circuits.

According to the present invention it is therefore provided that auxiliary switches are connected in series with the mechanically actuated switches that control the load circuits, which auxiliary switches are switched on and off by pulses, the pulses being generated in a secondary motor winding electrically connected with said auxiliary switches, by the switching on and off of the motor by a command switch.

In further development of the invention it is provided that the pulses of the secondary winding of the motor are transmitted to the auxiliary switches through a transformer.

It is also important in this connection that the auxiliary switches be made electrically nonconductive by a pulse generated in the motor secondary winding through the switching on of the motor by the command switch, and that they be made electrically conductive through the pulse generated by the switching off of the motor.

It is further provided according to the present invention that electronic switches be used as auxiliary switches. Preferably, the auxiliary switches are of the electronic flip-flop type.

An embodiment of the present invention will now be further explained, with reference to the accompanying drawing.

An electronic drive motor 1 which, when it is switched on, drives via a coupling 3 an arresting device 4, a gear unit 7, a timed switching mechanism 8 and a cam disc assembly 11. Motor 1 has an axially displaceable armature, which in its inoperative position, when the motor stands still and is not energized, occupies the position symbolically indicated by broken line 2 and which, when the motor is energized, actuates coupling 3 so that the mechanical connection between motor 1 and arresting device 4 is then established.

Motor 1 has an exciter coil 5, one end of which is connected via line 22 to a pole, not shown, of a voltage source, and whose other end can be connected via a plurality of parallel-coupled command switches 23, 24, 25, 26, 27 and 28 and a line wire 21 to the other pole of the same voltage source.

Cam disc assembly 11 serves as a programmed switching element for the control of mechanically actuated switches which in the drawing are represented only symbolically by the contact pairs 13 and 14. The individual cams, not represented in detail in the drawing, of cam disc assembly 11, are disposed on concentric circular tracks 12 in certain combinations corresponding to the program, in such manner that after each switching step of the cam disc assembly 11, specific contact pairs 13,14 are closed or opened.

While contacts 14 are connected through leads 15 with the input terminals of the various loads or to electric relay switches or the like connected in series with these loads, whose output terminals are connected with a pole, not shown, of a voltage source, contacts 13 are connected through leads 13' via auxiliary switches 17, 18, 19 and 20 with the other pole 16 of the voltage source. The leads 15, contact pairs 13 and 14 that represent the mechanically actuated switches, as well as leads 13' and pole 16 represent parts of mutually independent load circuits, but which cooperate in the overall performance of the machine.

Auxiliary switches 17, 18, 19 and 20 are connected in series with the respective contact pairs 13, 14.

In the illustrated embodiment, auxiliary switches 17, 18, 19 and 20 are developed as electronic flip-flop switches and are controlled by a circuit 20' common to all the auxiliary switches, which circuit is connected with a pulse transformer 9. The primary winding of pulse transformer 9 is connected through leads 9', 9' with a secondary winding 6 which is electrically interlinked with winding 5 of motor 1.

The switch 30 in lead 22 is actuated by switching mechanism 8 in such a way that it is closed after the lapse of a quite specific interval determined by a timer, and it remains closed until the next switching step of program control disc 11 has been completed. Then switch 30 is again opened. For this effect, there is a known timer device in switching mechanism 8 which closes switch 30 after the specified time interval, and also another stop device which holds switch 30 closed until the switching step of switching disc 11 has been completed, and which opens it again after the switching step of disc 11. The triggering of the switching step of program disc 11 occurs in dependence upon the closing of one of the auxiliary switches 23 to 28.

Command switches 23 to 28 are actuated when specific conditions have been reached in the washing machine. Among these are, for example, definite water temperatures, specific water levels in the washing machine, or definite running time of any cycle of the machine, for example of the washing cycle, the centrifuging cycle or the rinse cycle. That means that one of the command switches 23 to 28 for example is controlled by a thermostat, in such a manner that when a water temperature of, for example, 90° C. is reached, command switch 28 is closed. The closing of this switch causes the switching on of motor 1. Motor 1 starts and cam disc assembly 11 is advanced by one switching step. The same can take place when, for example, command switch 27 is closed when the water level reaches a predetermined height in the washing machine, or when command switch 24 is actuated by a timer after the passing of a certain period of time.

It is true that command switches 23 to 28 are represented symbolically in the drawing as mechanical contact switches, but these switches can be electromagnetically actuated if they are controlled by electric control elements, or else they may comprise electronic switches, for example, employing a type of multivibrator.

When the motor is switched on, the sliding armature is correspondingly displaced, and the coupling gear assembly shown at 3 produces the mechanical connection between the motor and the arresting device 4. In the arresting device there is disposed a reduction gear which on the one hand drives the switching mechanism 8 via the intermediate gear 7 and on the other hand drives cam disc assembly 11 for the duration of a switching step that cam disc assembly 11 has to carry out. In the switching mechanism 8 are the mechanical drive parts of a kind that is known per se, which steps the program switching disc assembly 11 each time by the length of one switching step. The arresting device 4, gear unit 7 and switching mechanism 8 are generally known devices which are not the subjects of the present invention.

Cam disc assembly 11 has four main cam tracks 12, each with several switching cams, of which each is assigned a certain switching position on the cam disc. These switching cams act on contacts 13 and 14 in such manner that when a switching cam stands beneath a pair of contacts 13 and 14, the said contacts are closed. Four mutually separate circuits are controlled by contact pairs 13—14 and electronic switches 17, 18, 19 and 20, in which circuits, for example, the heating device, a water inlet valve, a water outlet valve and the washing machine drive motor are included. According to the position of cam disc assembly 11, one or more contact pairs 13—14 are closed. Thus, for example, when the two upper contact pairs 13—14 are closed, then the washing machine and the heater which heats the water present in the washing machine will be switched on simultaneously via electronic switches 17 and 18.

The electronic auxiliary switches 17, 18, 19 and 20 are so connected that they establish the electrical connections between pole 16 of the load circuit and contacts 13,14 only when a corresponding pulse from the secondary winding 6 in motor 1 has been generated. This energizing pulse is generated when winding 5 of the motor is disconnected, i.e., when a large voltage jump in secondary winding 6 induces a negative pulse which reaches the auxiliary switches 17, 18, 19 and 20 via the pulse transformer 9 and circuit 20'.

When now, for example, after the opening of the switch 30 that is included in line 22, winding 5 of motor 1 is disconnected from its power source, the negative control pulse will arise in secondary winding 6, tripping electronic auxiliary switches 17, 18, 19 and 20 into the position in which they establish a conductive connection between pole 16 and contacts 13.

In the same way, the electronic auxiliary switches 17, 18, 19 and 20 are again tripped into their nonconductive position by a positive control pulse arising in winding 6 by the closing of one of the command switches 23 to 28. Thus, simultaneously with the actuation of command switch 28 which, for example, is closed when the water temperature has reached 90° C., the circuit of the heater is also broken by electronic auxiliary switch 17. With the closing of command switch 28, the motor 1 is then started at the same time. But since contacts 13,14 already are separated through the changeover of electronic auxiliary switches 17, 18, 19 and 20 from pole 16, before cam disc assembly 11 begins to turn, the said contacts 13,14 no longer carry any voltage when they are actuated by the cams of cam disc assembly 11. As long as motor 1 is energized and drives, the electronic switches 17, 18, 19 and 20 are not conductive and do not again become conductive until the corresponding control pulse has been induced in secondary winding 6 by the shutting off of motor 1, the pulse then being conveyed to switches 17, 18, 19 and 20. The result is that contacts 13,14 only become voltage-carrying after cam disc assembly 11 has stopped, so that contact pairs 13,14 never carry voltage during their switching operation and thus are not subjected to the harmful burnoff caused by sparking. A further disadvantage attained thereby consists in that the arrangement of the cams on cam disc assembly 11 and also the individual step movement of cam disc assembly 11 no longer are subject to such high requirements in the matter of accuracy.

The switches 17 to 20 are electronic switches, namely, flip-flops, which react differently to positive and negative control pulses. When the circuit of coil 5 is closed, there is a voltage jump from zero to a specific maximum value, which creates a positive voltage or current pulse in coil 6 which is transmitted in turn through transformer 9 to circuit 20' of switches 17, 18, 19 and 20. These electronic switches 17 to 20 react to such a positive current or voltage pulse by flipping (being "tilted") from the conducting to the nonconducting state. This "tiling" is a purely electronic process in which one of the pair of transistors of each flip-flop switch 17, 18, 19 and 20 becomes conducting while the other transistor is blocked. With the interruption of the circuit of coil 5, the current suddenly drops in coil 5 from a specific value to zero and thereby creates an oppositely directed pulse in coil 6. In other words, if the pulse is positive when the coil is switched on, there is a negative pulse when coil 5 is switched off. Flip-flops 17 to 20 react in the opposite manner to this negative pulse, i.e., the transistor that had become conducting through the previous positive pulse is now blocked so that leads 13' are disconnected from pole 16.

In order that the necessary positive and negative pulses for control (opening and closing of switches 17 to 20) can be developed directly from motor coil 5 in secondary coil 6, it is provided on the one hand that contacts 13 are separated during each switching step of program control disc 11 from pole 16 and do not transmit current, and on the other hand it is provided that no supplementary control means is required to effect this condition. Thus, through coil 6, or through development of the control pulse for switches 17 to 20 directly in motor 1, actuation of switches 17 to 20 and the switching on and off of motor 1 are synchronized.

The drawing shows the motor 1 in an operating condition, for example, in response to the closure of a command switch 23. Under these conditions the auxiliary switches 17 to 20 have been rendered nonconducting, and the cam switch contacts 13—14 can open or close without sparking. The end of the step produced by the action of the conventional device 8 causes switch 30 to open for a timed period and stops the motor with contacts 13—14 closed or open as required by the command. Stepping the motor restores conductively of the series auxiliary switches 17 to 20, allowing the selected load device or devices to function.

What I claim is:

1. A programmed control system comprising an electrical load device, a load-energizing circuit connected to said load device, said load-energizing circuit including in series a mechanical switch means and an electronic switch means, cam means operating said mechanical switch means, stepping drive means operatively connected to said cam means to actuate said cam means in programmed steps, said drive means including an electric drive motor, an energizing circuit connected to said motor and including a command switch, circuit means to render said electronic switch means nonconducting responsive to energization of said motor, whereby to open said load-energizing circuit and to prevent sparking at said mechanical switch means during a motor-driven program step of said cam means, and means to render said electronic switch means conducting responsive to the deenergization of said motor at the end of a program step, whereby to restore said load-energizing circuit after the completion of the operation of said mechanical switch means.

2. The programmed control system of claim 1, and wherein the system includes several mutually independent load devices with respective load-energizing circuits connected thereto, each load-energizing circuit including in series a mechanical switch means and an electronic switch means, and wherein the cam means includes respective cam elements operatively engageable with said mechanical switch means according to the program, circuit means to simultaneously render all said electronic switch means nonconducting and to open the load-energizing circuits responsive to the energization of said motor to initiate a program step, and means to simultaneously restore conductivity of all said electronic switch means responsive to the deenergization of said motor at the end of a program step.

3. The programmed control system of claim 2, and wherein said drive motor energizing circuit includes a plurality of different command switches connected in parallel.

4. The programmed control system of claim 3, and wherein said motor is provided with a secondary winding generating respective distinctively different types of pulses responsive to energization and deenergization of said motor, and the circuit means to render the electronic switch means nonconducting and conducting is connected between said secondary winding and said electronic switch means.

5. The programmed control system of claim 4, and wherein said electronic switch means comprises respective electronic flip-flop switches having inputs operatively connected to said secondary winding.

6. The programmed control system of claim 5, and wherein a pulse coupling transformer is connected between said secondary winding and the inputs of the flip-flop switches.

7. In a programmed switching device, a step motor having a drive winding and a secondary winding electromagnetically coupled to said drive winding, a cam switch assembly drivingly connected to said step motor, mechanical load switch means operated by said cam switch assembly, electronic switch means connected in series with said load switch means, control circuit means connecting said secondary winding to said electronic switch means for rendering the electronic switch means nonconducting responsive to energization of said drive winding and rendering said electronic switch means conducting responsive to deenergization of said drive winding, and energizing circuit means including at least one command switch connected to said driven winding.

8. The programmed switching device of claim 7, and wherein said electronic switch means comprises a flip-flop electronic switch having an input circuit controlling its conductivity and wherein said control circuit means comprises a pulse transformer having a primary winding connected to said first-named secondary winding and having a secondary winding connected to the input circuit of the flip-flop electronic switch.

9. The programmed switching device of claim 7, and wherein said electronic switch means comprises a plurality of electronic switches and said load switch means comprises a like number of cam-operated mechanical switches, the respective electronic switches being connected in series with the cam-operated switches.

10. The programmed switching device of claim 9, and wherein said electronic switches are of the flip-flop type and have parallel-connected input circuits controlling their conductivity, said control circuit means comprising a pulse transformer having its primary winding connected to said step motor secondary winding and having is secondary winding connected to said parallel-connected flip-flop input circuits.